United States Patent [19]

McKedy

[11] Patent Number: 5,262,375

[45] Date of Patent: Nov. 16, 1993

[54] OXYGEN ABSORBER

[75] Inventor: George E. McKedy, Williamsville, N.Y.

[73] Assignee: Multiform Desiccants, Inc., Buffalo, N.Y.

[21] Appl. No.: 888,966

[22] Filed: May 26, 1992

[51] Int. Cl.⁵ .................. B01J 20/04; B01J 20/10; C09K 15/02

[52] U.S. Cl. .................. 502/406; 252/188.28; 423/219; 426/124; 426/395; 502/400; 502/402; 502/407; 502/405; 95/138

[58] Field of Search .................. 502/406, 405; 252/188.28

[56] References Cited

U.S. PATENT DOCUMENTS

| | | | |
|---|---|---|---|
| 4,166,807 | 9/1979 | Komatsu et al. | 502/62 |
| 4,192,773 | 3/1980 | Yoshikawa et al. | 502/406 |
| 4,230,595 | 10/1980 | Yamaji et al. | 252/188.28 |
| 4,299,719 | 11/1981 | Aoki et al. | 252/188.28 |
| 4,366,179 | 12/1982 | Nawata et al. | 426/395 |
| 4,769,175 | 9/1988 | Inoue | 252/188.28 |
| 4,996,068 | 2/1991 | Hatakeyama et al. | 426/234 |
| 5,151,262 | 9/1992 | Pemsler et al. | 423/561.1 |
| 5,207,943 | 5/1993 | Cullen et al. | 252/188.28 |

*Primary Examiner*—Paul E. Konopka
*Attorney, Agent, or Firm*—Joseph P. Gastel

[57] ABSTRACT

An oxygen-absorbing composition containing particulate annealed electrolytically reduced iron of between about 100 mesh and 325 mesh in an amount of about up to 99.6% by weight, a salt such as sodium chloride in an amount by weight of about up to 3.5%, and optionally a water-attracting and supplying component such as silica gel of a mesh size of between about 30 mesh and 325 mesh in an amount by weight of up to about 80%. A packet for absorbing oxygen including a stain and grease resistant envelope containing the oxygen-absorbing composition. A grease and stain resistant laminate consisting of plies of various plastics and grease and stain resisting paper.

14 Claims, 3 Drawing Sheets

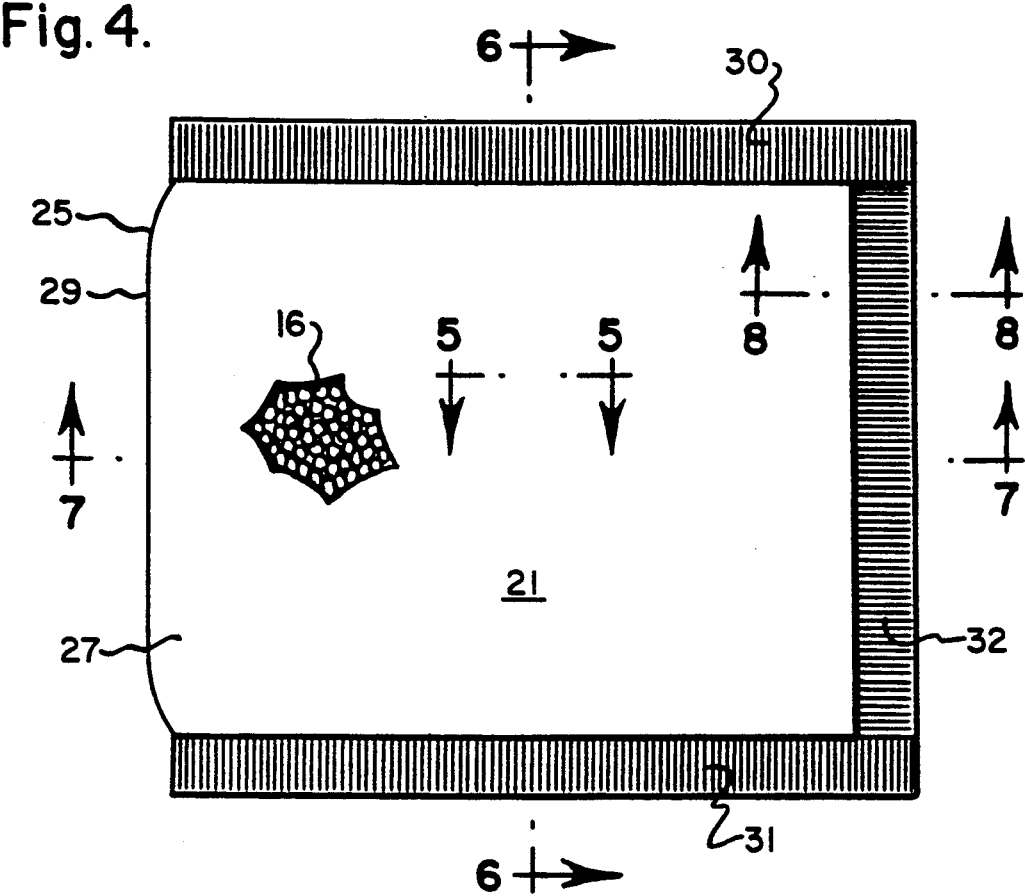
Fig. 4.
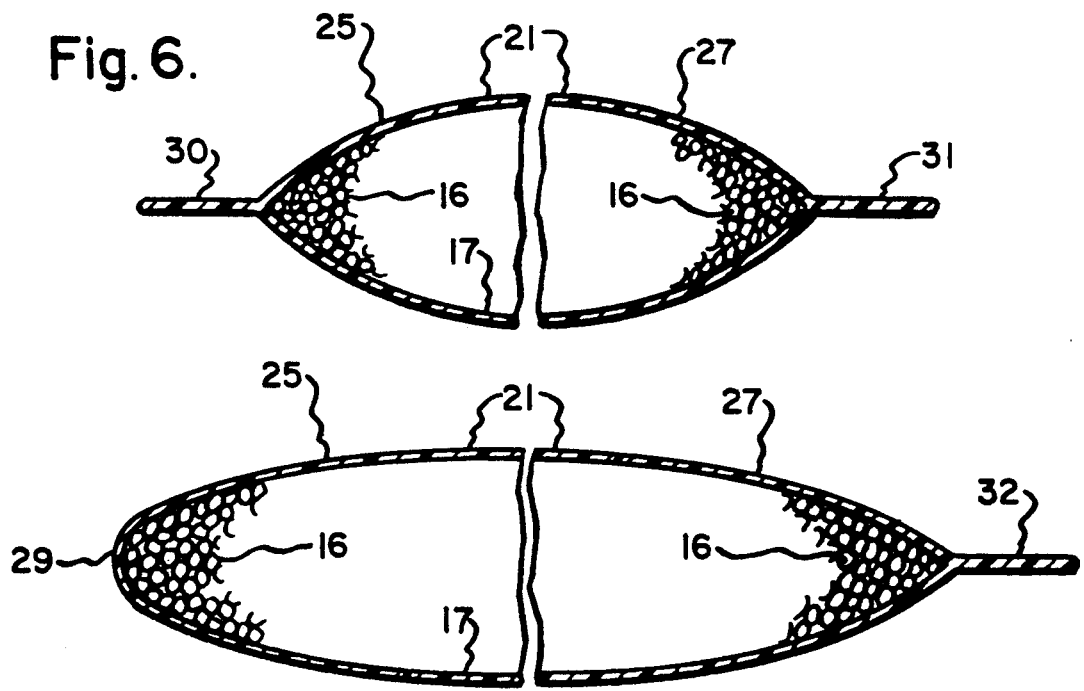
Fig. 6.
Fig. 7.

OXYGEN ABSORBER

BACKGROUND OF THE INVENTION

The present invention relates to an improved oxygen absorber and oxygen-absorbing method, especially for absorbing oxygen in low temperature environments.

By way of background, particulate iron is known as an oxygen absorber because it readily combines with oxygen. In the past, various types of particulate iron have been used, including hydrogen reduced iron, electrolytically reduced iron, atomized iron, and milled pulverized iron. However, the hydrogen reduced iron, the atomized iron and the milled pulverized iron absorb oxygen relatively slowly. The electrolytically reduced iron absorbs oxygen faster but at lower temperatures at which food are normally refrigerated it absorbs oxygen at a slower rate than desired to remove the oxygen before the initial stages of food spoilage commence.

SUMMARY OF THE INVENTION

It is the primary object of the present invention to provide an improved oxygen-absorbing composition which includes particulate annealed electrolytically reduced iron which will provide a more rapid rate of oxygen absorption than plain electrolytically reduced iron, especially at lower temperatures.

Another object of the present invention is to provide an improved method of oxygen absorption utilizing particulate annealed electrolytically reduced iron. Other objects and attendant advantages of the present invention will readily be perceived hereafter.

The improved oxygen-absorbing composition comprises in relatively sufficient proportions particulate annealed electrolytically reduced iron, and salt means for producing an electrolyte so as to activate the iron.

The improved method of absorbing oxygen from a product in a closed container which is subjected to temperatures below 50° F. comprises the steps of placing said product into a container which is to be subjected to temperatures below 50° F., and adding a mixture particulate annealed electrolytically reduced iron and a salt to the container.

The present invention also relates to a packet for absorbing oxygen comprising an oxygen-absorbing composition, and an envelope containing said oxygen-absorbing composition, said envelope comprising a laminate of material contacting layer, water and grease resistant paper, a first sealing layer between said material contacting layer and said water and grease resistant paper, and a second sealing layer on the opposite side of said laminate from said material contacting layer.

The present invention also relates to a laminate for fabrication into an envelope comprising a first sealing layer of ethylene vinyl acetate, a layer of water and great resistant paper, a material contacting layer of polyester, and a second sealing layer of low density polyethylene for tying said layer of polyester and said layer of water and grease resistant paper.

BRIEF DESCRIPTION OF THE DRAWINGS

FIG. 4 is a plan view of a packet which utilizes a preferred material for the envelope;

FIG. 6 is a fragmentary cross sectional view taken substantially along line 6—6 of FIG. 4;

FIG. 7 is a fragmentary cross sectional view taken substantially along line 7—7 of FIG. 4.

DESCRIPTION OF THE PREFERRED EMBODIMENTS

The improved oxygen absorber and method of oxygen absorption are intended primarily for use with various types of food products or anything that requires refrigeration at temperatures below the ambient temperature and generally at temperatures below about 50° F. and more specifically below about 40° F. It has also been found that the improved oxygen absorber comprising annealed electrolytically reduced iron is also more efficient at normal ambient temperatures than conventional oxygen absorbers, such as particulate electrolytically reduced iron which has not been annealed. In this respect, it is believed that the annealing changes the structure of the electrolytically reduced iron by inceasing the surface area which, in turn, causes it to be more active in its oxygen-absorbing capacity.

The improved oxygen absorber in its most basic form comprises particulate annealed electrolytically reduced iron plus a salt which combines with moisture to produce an electrolyte for activating the iron to absorb oxygen.

The improved method of absorbing oxygen comprises the use of particulate annealed electrolytically reduced iron and a salt in a container subjected to refrigeration for absorbing the oxygen in the container.

Figure 1:
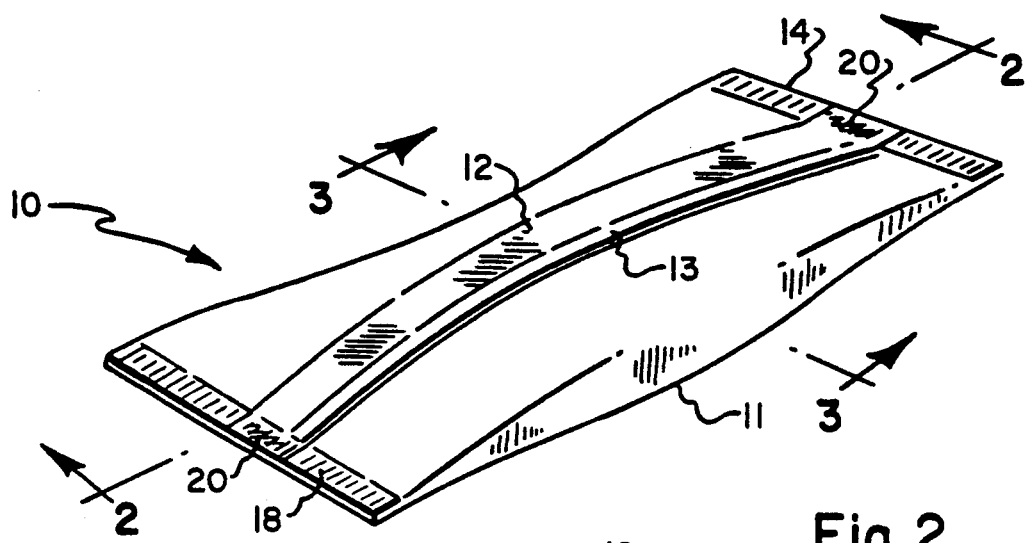
FIG. 1 is a perspective view of an oxygen-absorbing packet of the present invention.
Figure 2:
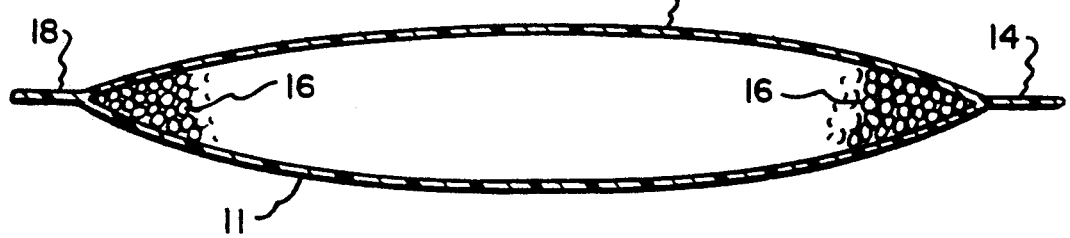
FIG. 2 is a cross sectional view taken substantially along line 2—2 of FIG. 1.
Figure 3:
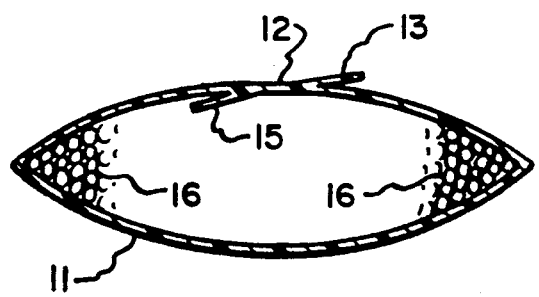
FIG. 3 is a cross sectional view taken substantially along line 3—3 of FIG. 1.

One embodiment of a packet 10 which comprises the improved oxygen absorber is shown in FIGS. 1-3. The packet 10 of this embodiment includes an envelope 11 of spun-bonded polyolefin which is known under the trademark TYVEK. Envelope 10 is formed by folding flexible planar material into tubular form and fusing it along overlapping edge portions 13 and 15 to provide a seam 12. The end portion is then fused at 14, as by heat and pressure, and the envelope is then filled with oxygen-absorbing material described hereafter. Thereafter, the other end portion is fused at 18, as by heat and pressure to close the envelope. The ends of seam 12 are secured to end portion 18 at 20. This envelope structure is generally described in U.S. Pat. No. 4,992,410, which is incorporated herein by reference. However, it will be appreciated that other suitable envelope constructions may be used, and a preferred construction is described at an appropriate point hereafter.

The particulate annealed electrolytically reduced iron which is used in the oxygen-absorbing composition 16 can be of a size of between about 100 mesh and 325 mesh and more preferably between about 100 mesh and 200 mesh and most preferably about 200 mesh. It has been found that the larger the mesh size, the slower will be the reaction. Thus, 100 mesh will react more slowly than 200 mesh which will react more slowly than 325 mesh. However, the 325 mesh size is difficult to handle with certain packaging machinery. Particulate annealed electrolytically reduced iron of various sizes which have been used are manufactured by the SCM Corporation under the designations A-210 (100 mesh), A-220 (200 mesh) and A-230 (325 mesh).

Another component of the oxygen-absorbing composition is a salt which, when combining with water, will form an electrolyte to activate the particulate iron. The salt is preferably sodium chloride which may be present by weight in an amount of between about 0.4% to 3.5% and preferably between about 2% and 2.5%. The salt should be present in an amount so that it is sufficiently concentrated relative to the iron so that all portions of the iron are in contact with the electrolyte which is formed by the salt. Above 3.5% no increase in reaction rate occurs. The exact amount of sodium chloride is not critical. The salt can be between about 48 mesh and 325 mesh. It will be appreciated that if an excessive amount of iron is used for a particular environment, the amount of salt could be less than 0.4% by weight, and thus there will be oxygen absorption at a good rate, but the system will be inefficient. Therefore, it will be appreciated that the only requirement, if efficiency is not a factor to be considered, is that the particulate annealed electrolytically reduced iron and the salt should be present in sufficiently relative proportions to absorb oxygen at a desired rate.

Other equivalent salts may be substituted for the sodium choride, and these include, without limitation, calcium chloride, potassium chloride, magnesium sulfate, magnesium chloride, barium chloride, potassium nitrate, potassium phosphate, potassium hypophosphate, sodium carbonate and potassium carbonate. However, sodium chloride, potassium iodide, potassium bromide, calcium chloride and magnesium chloride are preferred.

The composition of particulate annealed electrolytically reduced iron and salt provides effective oxygen absorption in atmospheres or containers wherein there is sufficient moisture to combine with the salt to produce an electrolyte. However, in environments wherein the amount of moisture is relatively low, a water-attracting and supplying component can be added to the particulate annealed electrolytically reduced iron and salt. The water-attracting and supplying component can be a silica gel which has a water-attracting and supplying capacity. The silica gel may be present by weight in any amount up to about 80% and more preferably between about 40% and 50%. The water content of the silica gel by weight can vary from 0% to 32% and more preferably between about 18% and 26%.

When the water-attracting and supplying component is used, the salt can be added to both the silica gel and to the iron prior to combining them. The salt can be added to the silica gel by dissolving it in water before being added to the silica gel. The silica gel can have a mesh size of between about 30 mesh and 325 mesh. However, the mesh size is not critical. Other water-attracting and supplying components may be used and these include without limitation diatomaceous earth, perlite, zeolite, activated carbon, sand, salt, activated clay, molecular sieve, cellulose, acrylic polymers or other natural and synthetic polymers.

The improved oxygen absorber is packaged in a moisture and oxygen permeable envelope which will permit oxygen and moisture to pass therethrough to combine with the particulate annealed electrolytically reduced iron and the salt, if used. Envelopes have been satisfactorily fabricated from a material which is known under the trademark of TYVEK which is a spun-bonded polyolefin and is a product of DuPont de Nemours, E. I., and Company. The spun-bonded polyolefin will pass water vapor and oxygen, but will not pass liquid water. Therefore, such envelopes are extremely satisfactory for use in containers which may have liquid water therein. The envelope containing the oxygen-absorbing composition comprises a packet which is placed in various types of containers including the type wherein meat is placed on a plastic tray and wrapped with shrink-wrap or other plastic which causes the container to be hermetically sealed. However, the packets can also be placed in cans or jars which are sealed.

Figure 5:
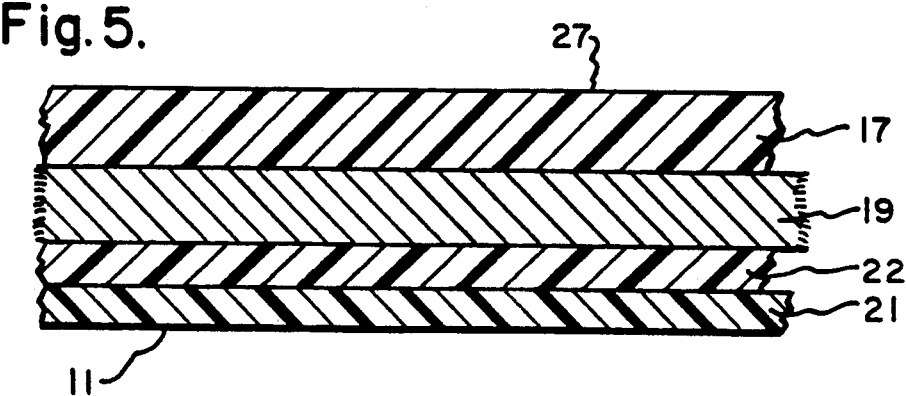
FIG. 5 is an enlarged cross sectional view taken substantially along line 5—5 of FIG. 4 and showing the material which is utilized to form the envelope of the oxygen-absorbing packet.
Figure 8:
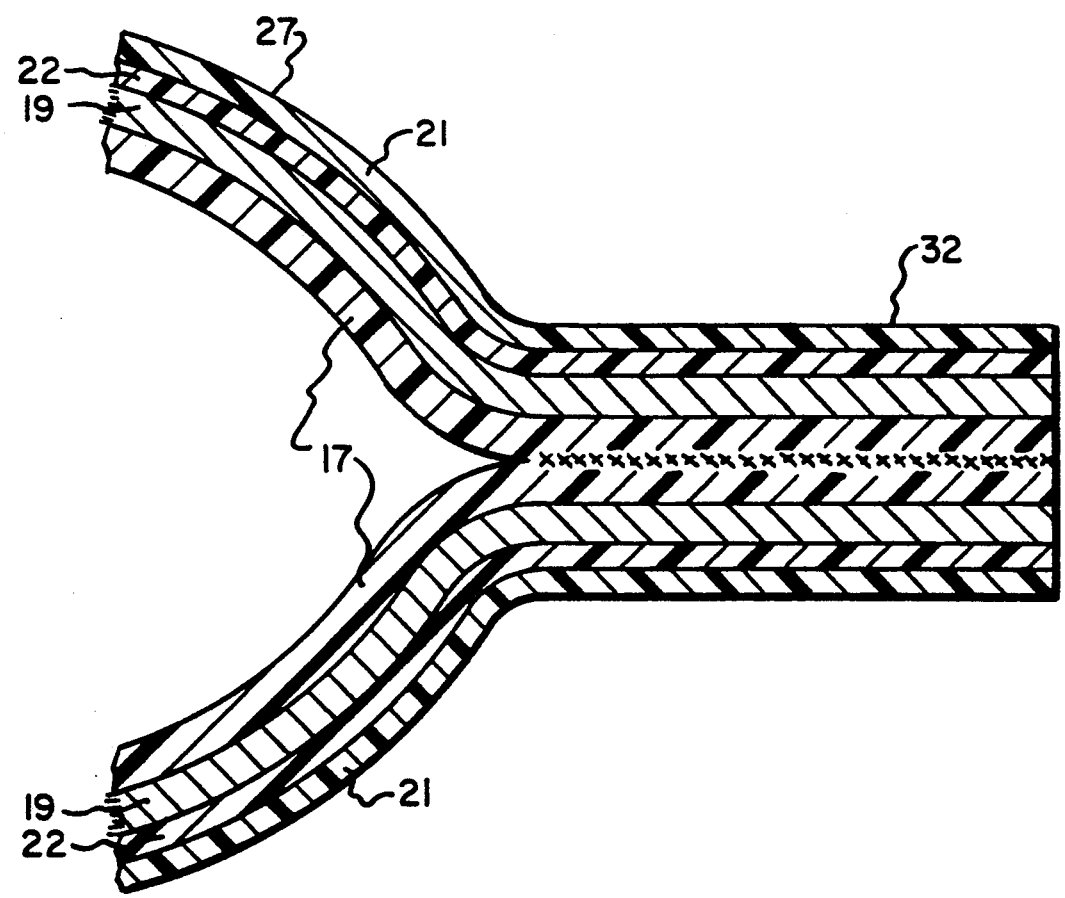
FIG. 8 is a fragmentary cross sectional view taken substantially along line 8—8 of FIG. 4 and showng the structure of the seams.

The preferred material from which an envelope 25 is fabricated is shown in FIG. 5 and an envelope fabricated therefrom is shown in FIG. 4. The material is a laminate 27 consisting of an inner layer 17 of EVA (ethylene vinyl acetate) 30 microns thick; a layer of water and grease resistant paper 19 having a weight of 50 grams per square meter; a layer 22 of low density polyethylene 15 microns thick; and an outer layer 21 of microperforated polyester film 12 microns thick. It will be appreciated that the foregoing dimensions may vary. Layer 19 of water and grease resistant paper limits migration of material into and out of the envelope 11 and prevents staining thereof from food on the outside and rust from oxidation of the iron inside the envelope 11. Layer 22 of low density polyethylene is a seal layer to seal layers 19 and 21 to each other. Inner layer 17 is sealed to paper layer 19. The perforated polyester outer layer 21 is the material which contacts food or other substances within a container into which packet 10 is placed. The layers 17, 19, 22 and 21 are sealed into the laminate 27 by suitable heat and pressure.

The envelope 25 which is fabricated from laminate 27 is shown in FIGS. 4, 6 and 7. The envelope 25 is fabricated from a folded-over piece of material 27 at fold 29, and the inner layer 17 is sealed to itself by heat and pressure to form seams 30, 31 and 32. The oxygen-absorbing composition 16 is placed within envelope 25 prior to sealing the last of seams 30, 31 or 32. The TYVEK material discussed above relative to FIGS. 1-3 can also be fabricated into an envelope, such as shown in FIGS. 4, 6 and 7. The envelope may also be fabricated from any other suitable material including but not limited to oil and water impermeable paper, coated paper, or plastic film such as polyethylene, polypropylene, EVA or polyethyleneterephthalate, surlyn, or laminates thereof which may or may not be micro-perforated, which is vapor and gas permeable so that oxygen will pass therethrough but liquid water will not.

The oxygen absorber composition utilizing annealed electrolytically reduced iron can be made into a label utilizing any of the foregoing envelope materials which can be adhesively secured to the inside of a wrapper or a container. The oxygen absorber will thus absorb oxygen from any air which is trapped within the package or container after it has been hermetically sealed, and it will also attract oxygen which may originally exist within the product itself which is within the package.

The oxygen absorber is intended to be used with all types of food products which may be deleteriously affected by the presence of oxygen or any other type of product which is packaged and which must be protected from the deleterious affect of oxygen. These products include, without limitation, foods such as pasta, meat, fish or anything else which will be affected in taste or quality by the presence of oxygen.

As noted above, the improved oxygen absorber which includes particulate annealed electrolytically reduced iron is especially beneficial at refrigerated temperatures, that is, all temperatures below about 50° F. and more preferably between about 32° F. and 40° F. It is also beneficial as low as 28° F., and it is believed to be beneficial at temperatures below 28° F. Stated more broadly, the improved oxygen absorber is intended for use especially at any refrigerated temperature which is below the normal ambient temperature. As noted above, the oxygen absorber containing the particulate annealed electrolytically reduced iron is also more effective at ambient temperatures than such a product which has not been annealed or other types of particulate iron which have heretofore been used for oxygen absorption.

Various compositions have been formulated utilizing particulate annealed electrolytically reduced iron as follows:

EXAMPLE 1

A composition was prepared by mixing 0.5 grams of 200 mesh annealed electrolytically reduced iron with 0.5 grams of 100 mesh annealed electrolytically reduced iron. Both types of iron were previously blended with 2% by weight of sodium chloride having a particle size of about 325 mesh. The foregoing composition was sealed in a TYVEK envelope which was placed in a 1000 cc sealed glass jar containing atmospheric air having about 20.6% oxygen. The jar also contained a piece of blotter paper containing about one gram of water to provide moisture. The jar was placed in a refrigerator having a temperature of 39° F. With the foregoing blend, 59 cc of oxygen were absorbed in 24 hours, and 156 cc of oxygen were absorbed in 48 hours.

EXAMPLE 2

The same formulation as set forth in Example 1 was placed in a 2-gallon plastic air-tight container having 7500 cc of atmospheric air containing about 20.6% of oxygen, or 1559 cc of oxygen. A piece of blotter paper containing four grams of water was also placed in the container. The container was sealed and placed in a 39° F. refrigerator. The theoretical capacity of the formulation containing one gram of iron is 295 cc of oxygen. At refrigerated conditions of 39° F., the above formulation absorbed 20% of its theoretical capacity of 295 cc of oxygen, or 59 cc, in 24 hours and a total of 53%, or 156 cc, theoretical capacity of 295 cc in 48 hours.

EXAMPLE 3

A mixture was provided in a TYVEK packet containing 0.5 grams of 200 mesh annealed electrolytically reduced iron, 0.5 grams of 100 mesh annealed electrolytically reduced iron, and 0.8 grams hydrated silica gel containing 21% moisture. The composition also contained 1.5% by weight of sodium chloride having a mesh size of 325. The hydrated silica gel had a mesh size of between 30 and 200. The above formulation was placed in a TYVEK envelope, and the sealed envelope was inserted into a 1000 cc glass jar containing atmospheric air containing about 206 cc of oxygen which was then sealed and placed in a refrigerator having a temperature of 39° F. The foregoing formulation absorbed 35% of its theoretical capacity of 295 cc of oxygen in 24 hours, and it absorbed 58% of its theoretical capacity of 295 cc of oxygen in 48 hours. Thus, it absorbed 103 cc of oxygen in 24 hours and 171 cc in 48 hours. It can thus be seen that Example 3 which contains the hydrated silica gel is much faster acting in the first 24 hours than the composition of Example 1 which contains the same amounts of 100 mesh and 200 mesh iron but does not contain the silica gel.

Comparisons were made of the oxygen-absorbing characteristics of like compositions of both annealed electrolytically reduced iron and non-annealed electrolytically reduced iron, and it was found that the former absorbed oxygen at a much faster rate. More specifically, two compositions were made. Composition A contained 0.85 grams of 200 mesh annealed electrolytically reduced iron and 1.36 grams of silica gel containing 23% water and 1.5% sodium chloride. Composition B had the same ingredients, except that the iron was electrolytically reduced, but not annealed. Each composition, after blending, was placed in a TYVEK envelope and each was then placed in a separate air-tight glass container having about 500 cc of atmospheric air which included about 100 cc of oxygen. The containers each also had a piece of blotter paper placed therein containing one gram of water. Each container was then placed in a 38° F. refrigerator. The following rates of oxygen absorption were observed:

| AMOUNTS OF OXYGEN ABSORBED IN CC | | |
| --- | --- | --- |
| Elapsed time in hours | Composition A (Annealed) | Composition B (Non-annealed) |
| 19 | 91 | 29 |
| 25 | 100 | 60 |
| 28 | — | 71 |
| 42 | — | 100 |

It was also found that the reaction temperatures utilizing annealed electrolytically reduced iron at ambient temperatures was much faster than the use of electrolytically reduced iron which was not annealed.

Tests were made of the rate of oxygen absorption of a mixture containing annealed electrolytically reduced iron at room temperature of about 72° F. A mixture containing 0.85 grams of A-220 annealed electrolytically reduced iron of 200 mesh with 1.36 grams of silica gel containing 26% water and 1.5% sodium chloride was placed in a TYVEK envelope which was sealed. The packet consisting of the sealed envelope and its contents was placed in a 500 cc glass jar containing a gram of water on blotter paper. The jar contained 500 cc of atmospheric air containing about 100 cc of oxygen. Three jars were tested with one packet in each jar, and the average of three tests showed that after 2 hours 19 cc of oxygen were absorbed, after 4 hours 73 cc were absorbed, and at 6 hours 100 cc were absorbed. Tests were also made under substantially identical conditions with the only change being the use of non-annealed reduced iron. As a result of such tests, it was found that after 2 hours 7 cc of oxygen was absorbed, after 4 hours 10 cc was absorbed, after 7 hours 29 cc was absorbed and after 24 hours 100 cc was absorbed. The above data is set forth in the following table for ease of comparison:

| COMPARISON OF OXYGEN ABSORPTION RATES IN CC | | | | |
| --- | --- | --- | --- | --- |
| | Time in Hours | | | |
| Composition | 2 | 4 | 6 | 7 |
| A | 19 | 73 | 100 | — |

-continued

COMPARISON OF OXYGEN ABSORPTION RATES IN CC

| Composition | Time in Hours | | | |
|---|---|---|---|---|
| | 2 | 4 | 6 | 7 |
| B | 7 | 10 | — | 29 | where A is annealed electrolytically reduced iron and B is non-annealed electrolytically reduced iron.

Generally the finer the particulate iron which is used, the speedier will be the oxygen absorption. Thus, 325 mesh iron and above is preferred from a theoretical viewpoint. However, the fineness may be limited by the use of the machinery which is utilized to fabricate the packets or labels discussed above.

While preferred embodiments of the present invention have been disclosed, it will be appreciated that the present invention is not limited thereto but may be otherwise embodied within the scope of the following claims.

What is claimed is:

1. An oxygen-absorbing composition comprising in relatively sufficient proportions particulate annealed electrolytically reduced iron, and salt for combining with water to produce an electrolyte which combines with said iron to cause it to absorb oxygen.

2. An oxygen-absorbing composition as set forth in claim 1 wherein said particulate annealed electrolytically reduced iron is present in weight in an amount of up to about 99.6% of the total weight of the composition.

3. An oxygen-absorbing composition as set forth in claim 2 wherein said particulate annealed electrolytically reduced iron is present by weight in an amount of at least about 96.5% of the total weight of the composition.

4. An oxygen-absorbing composition as set forth in claim 1 wherein said particulate annealed electrolytically reduced iron is of a size of between about 100 mesh and 325 mesh.

5. An oxygen-absorbing composition as set forth in claim 4 wherein said particulate annealed electrolytically reduced iron is present by weight in an amount of up to about 99.6% of the total weight of the composition.

6. An oxygen-absorbing composition as set forth in claim 4 wherein said particulate annealed electrolytically reduced iron is a mixture having a size of between about 100 mesh and 200 mesh.

7. An oxygen-absorbing composition as set forth in claim 4 wherein said particulate annealed electrolytically reduced iron is of a size of about 100 mesh.

8. An oxygen-absorbing composition as set forth in claim 1 including a water-attracting and supplying component for attracting water and supplying said water to said salt means to produce said electrolyte.

9. An oxygen-absorbing composition as set forth in claim 8 wherein said water-attracting and supplying component is present by weight in an amount of up to about 80% of the total weight of the composition.

10. An oxygen-absorbing composition as set forth in claim 9 wherein said water-attracting and supplying component is present in an amount by weight of between about 40% and 50% of the total weight of the composition.

11. An oxygen-absorbing composition as set forth in claim 8 wherein said particulate annealed electrolytically reduced iron is present by weight in an amount up to about 99.6% of the total weight of the composition, and wherein said water-attracting and supplying component is present in an amount of up to about 80% of the total weight of the composition.

12. An oxygen-absorbing composition as set forth in claim 8 wherein said annealed electrolytically reduced iron is present by weight in an amount of up to about 99.6% of the total weight of the composition, and wherein said water-attracting and supplying component is present by weight in an amount of at least about 40% of the total weight of the composition.

13. An oxygen-absorbing composition comprising by weight particulate annealed electrolytically reduced iron in an amount up to 99.6%, a salt for combining with water to produce an electrolyte in an amount up to about 3.5%, and a water-attracting and supplying component for attracting and supplying water to said salt in an amount of up to about 80%.

14. An oxygen-absorbing composition as set forth in claim 13 wherein said iron is of a size of between about 100 and 325 mesh, and wherein said water-attracting and supplying component is of a size of between about 30 mesh and 325 mesh.

* * * * *

UNITED STATES PATENT AND TRADEMARK OFFICE
CERTIFICATE OF CORRECTION

PATENT NO. : 5,262,375

DATED : November 16, 1993

INVENTOR(S) : George E. McKedy

It is certified that error appears in the above-identified patent and that said Letters Patent is hereby corrected as shown below:

```
Column 7, line 30 (claim 2), "in" (first occurrence) should
         read --by--.
```

Signed and Sealed this

Fifteenth Day of November, 1994

Attest:

BRUCE LEHMAN

*Attesting Officer*    *Commissioner of Patents and Trademarks*